Patented Nov. 16, 1943

2,334,545

UNITED STATES PATENT OFFICE 2,334,545

CONDENSATION PRODUCT OF A UREA, AN ALIPHATIC ALDEHYDE, AND A MONO SALT OF A POLYAMINE

Gaetano F. D'Alelio, Pittsfield, Mass., assignor to General Electric Company, a corporation of New York No Drawing. Application August 9, 1939, Serial No. 289,278

13 Claims. (Cl. 260—70)

This invention relates to new condensation products and to methods of making the same. The invention is concerned more particularly with self-curing aminoplasts by which are meant heat-convertible resinous condensation products prepared from amino or amido compounds and having the inherent characteristic of curing under heat or under heat and pressure to the insoluble, infusible state without the addition of a curing accelerator or catalyst.

In the production of aminoplasts it has heretofore been common practice in converting such materials to the insoluble, infusible state to incorporate into the condensation product or into the molding composition a latent or active (direct) curing catalyst. As pointed out more particularly hereafter, this technique and the final products have not been wholly satisfactory.

I have discovered that self-curing aminoplasts can be produced by condensing ingredients comprising a urea, an aliphatic aldehyde, for example formaldehyde, and basic polyamine salts such as hereafter more particularly identified. The initial condensation may be carried out at normal or at elevated temperatures, in the presence or absence of a condensation catalyst, under conditions more fully described hereinafter.

The basic polyamine salts used in practicing this invention are those organic and inorganic salts of organic compounds having a plurality of amino groups in which at least one hydrogen atom is attached to an amino nitrogen. As a result they are aldehyde-reactable and for purposes of brevity are so termed hereafter and in the appended claims. An example of such aldehyde-reactable basic polyamine salts is ethylene diamine monohydrochloride,

These basic polyamine salts may be prepared by the addition of an inorganic or organic acid to an aldehyde-reactable polyamine in such an amount that the derived product contains at least one amine salt group and one free basic group.

Illustrative examples of organic and inorganic acids which may be used in preparing these basic polyamine salts are hydrochloric, hydrobromic, hydroiodic, hydrofluoric, nitric, sulfuric, phosphoric, boric, selenic, chromic, acetic, propionic, butyric, valeric, formic, caproic, acrylic, methacrylic, oxalic, malonic, succinic, glutaric, adipic, lactic, citric, tartaric, malic, maleic, fumaric, itaconic, citraconic, propane tricarboxylic, benzoic, phthalic, salicylic, etc.

Illustrative examples of polyamines which may be used with the above-named acids in preparing the basic polyamine salts used in practicing this invention are triamino methane, ethylene diamine, unsymmetrical propylene diamine, trimethylene diamine, diethylene triamine, triethylene tetramine, phenylene diamine, ethylene diphenyl diamine, etc.

These basic polyamine salts readily react with aldehydes which in turn condense with urea substances. Or, the basic polyamine salts may also react with methylol derivatives of urea substances. When a basic polyamine salt, such as ethylenediamine monohydrochloride, is heated to a high temperature, say to about 150° C., a strongly basic substance is liberated as a gas, probably a mixture of ammonia and ethylene imine. This behavior is what should be expected, since in no way is it possible to neutralize two mols of a base with one mol of an acid. It is extremely surprising, in view of the present state of this art, that bodies, which, when heated alone, give active alkaline substances, should, when intercondensed with urea-aldehyde products, cause such products to become insoluble and infusible.

The urea component may be, for instance, urea (NH₂CONH₂) itself; thiourea; iminourea (guanidine); aldehyde-reactable substituted ureas, thioureas and iminoureas such as methyl urea, acetyl urea, benzoyl urea, phenyl thiourea, asymmetrical diethyl urea, allyl urea, 2-chloroallyl urea, ethylidene urea, methylol urea, methylene urea, dicyandiamide, guanylurea, guanylthiourea, biguanide, aminoguanidine, creatine (guanidine methyl glycine) and guanoline (guanido carbonic ethyl ester). Terms such as "a urea," "urea component" and "urea substance," as used generally herein and in the appended claims, are intended to include within their meaning substances of the kind above mentioned. Other examples of aldehyde-reactable compounds that may be used are creatinine, aminotriazoles, ethylene pseudosulfocarbamide derivatives, sulfohydantoin and aldehyde-reactable triazine derivatives.

In producing the new condensation products, which may be described more specifically as oc-condensation products, the choice of the aliphatic aldehyde component is dependent largely upon economic considerations and upon the particular properties desired in the finished product. I prefer to use as the aldehydic component formaldehyde or compounds engendering formaldehyde such as paraformaldehyde, hexamethylenetetramine, etc. For some applications I may use, for instance, acetaldehyde, propionaldehyde, butyraldehyde, acrolein, methacrolein, crotonaldehyde, etc., mixtures thereof, or mixtures of formaldehyde (or compounds engendering formaldehyde) with such aliphatic aldehydes. In general the longer the chain of the aliphatic aldehyde, the slower the cure of the resinous condensation product and the softer is the final product.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in resinous materials of the admixed-catalyst type. As the value of the molded article, especially light-colored articles, is materially influenced by its appearance, it is clear that the discoverey of any means for decreasing or eliminating entirely the production of imperfect articles which must be scrapped or sold at reduced price is of considerable commercial importance.

As a result of my invention the difficulties attendant the production of molding compositions comprising aminoplasts of the admixed-catalyst type are avoided. With such compositions there was, despite the most careful precautions, considerable variation in the curing rates of the individual batches. This made difficult the maintenance of production schedules. Considerable variation also was common even among different portions of the same batch of material, as evidenced by the appearance of the cured article.

The resin syrups and molding compositions of this invention may be stored for long periods of time without material alteration. In marked contrast therewith the prior heat-convertible aminoplasts, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect the condensation reaction between the aliphatic aldehyde and the other components is started under neutral or alkaline conditions. Acid conditions likewise may be used at the start of condensation, providing the basic amine salt is added to the initial condensation product after first having converted the composition to a neutral or alkaline condition. The reaction is then caused to proceed further to produce the self-curing aminoplasts of this invention, a truly surprising result when the alkaline condition of the basic polyamine salt is taken into account.

In obtaining the neutral, alkaline or acid conditions above described I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or of acids and acid salts.

Various ways may be employed for effecting initial reaction between the components. For example, I may first mix all of the reactants and effect condensation between the mixed reactants in the presence or absence of addition agents, as for instance, condensation catalysts, fillers, plasticizers, other natural or synthetic resinous bodies, solvents or diluents, etc. Alternatively, I may add the basic polyamine salt to a partial condensation product of a urea and an aliphatic aldehyde and effect further condensation between the components. Or, I may first condense the polyamine salt with an aliphatic aldehyde, add the resulting product to a urea-aliphatic aldehyde partial condensation product and then cause the reaction to proceed further. Or, I may condense or partially condense a basic polyamine salt with a mol excess of an aliphatic aldehyde, add a urea to this condensation product and effect further reaction between the components. Still other ways may be employed in combining the components and in producing the unmodified and modified condensation products of this invention, as will be readily understood by those skilled in the art as the description of the invention proceeds. These condensation reactions may proceed under a wide variety of time, temperature, and pressure conditions. The temperature of reaction may vary from room temperature to the reflux temperature of the reactants at reduced, atmospheric or superatmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified and unmodified resinous masses are self-convertible under heat or under heat and pressure to the insoluble, infusible state.

Depending upon the particular reactants employed and the particular conditions of reaction, these intermediate condensation products vary from clear, colorless, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. The liquid compositions may be used, for instance, as surface-coating materials, in the production of paints, varnishes, lacquers, enamels, etc., for general adhesive applications, as anti-creasing agents, in producing laminated articles, and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration. All parts are by weight.

Example 1

| | Parts |
|---|---|
| Urea | 60 |
| Aqueous ammonia (28%) | 15 |
| Aqueous formaldehyde-neutral (37.1%) | 161 |
| Aqueous ethylene diamine mono-hydrochloride (10%) | 3 |

All of the above reactants were mixed and heated under reflux for 2 minutes. The resulting hot resin syrup was compounded with 70 parts alpha flock and 0.4 part zinc stearate to form a molding composition. The molding compound was dried at 50° C. for 17 hours. The compound was molded under pressure at 130° C. to form molded articles of good appearance. They were well cured and exceptionally good flow was indicated.

Example 2

Same formulation as was used in Example 1. All of the components with the exception of the polyamine mono salt, specifically ethylene diamine monohydrochloride, were mixed and heated under reflux for 30 minutes. The non-curing alkaline resin syrup was allowed to cool, then the ethylene diamine monohydrochloride was added with no further refluxing of the mixture. The syrup was compounded with 70 parts alpha flock and 0.4 part zinc stearate, and the molding compound thus obtained was dried at 50° C. for 16 hours and further dried at 100° C. for 10 minutes. The compound was molded under heat and pressure to form molded products with good cures and good flow.

Example 3

| | Parts |
|---|---|
| Urea | 60.0 |
| Aqueous ammonia (28%) | 7.5 |
| Aqueous formaldehyde-neutral (37.1%) | 161.0 |
| Sodium hydroxide in 10 parts water | 0.04 |
| Aqueous monoacetic acid salt of ethylene diamine (10%) | 15.0 |

All of the above reactants with the exception of the diamine mono organic salt, specifically the monoacetic acid salt of ethylene diamine, were mixed and heated under reflux for 15 minutes. The monoacetic acid salt of ethylene diamine was then added and the mixture was refluxed for an additional 10 minutes to effect condensation between the components. The clear hot syrup was mixed with 70 parts alpha flock and 0.4 part zinc stearate to form a molding composition. The molding compound was dried at 50° C. for about 4 hours. The dried compound was molded under 2000 pounds per square inch pressure at 130° C. to form molded articles which were well cured.

Example 4

| | Parts |
|---|---|
| Urea | 60.0 |
| Hexamethylenetetramine | 17.5 |
| Aqueous formaldehyde-technical (37.1%) | 150.0 |
| Aqueous monoacetic acid salt of ethylene diamine (10%) | 15.0 |

The above components with the exception of the diamine mono inorganic salt were mixed and heated under reflux for 30 minutes. This product of partial condensation was mixed with 70 parts alpha flock and 0.4 part zinc stearate. The mixture was carefully dried at 50° C. for 1¼ hours. To this mixture was added the aqueous ethylene diamine acetate in 25 parts ethyl alcohol to facilitate mixing. The molding composition was heated at 50° C. to effect drying simultaneously with further condensation. The compound was molded at 130° C. for 4 minutes at 2000 pounds per square inch pressure to form molded articles which were well cured. The uncured compound when wet with water gave an alkaline reaction to litmus.

Example 5

| | Parts |
|---|---|
| Urea | 60.0 |
| Aqueous formaldehyde-neutral (37.1%) | 161.0 |
| Aqueous monoacetic acid salt of ethylene diamine (10%) | 7.5 |

The formaldehyde and urea were mixed and heated under reflux for 15 minutes. The diamine mono salt, specifically the monoacetic acid salt of ethylene diamine, was added and the mixture again heated under reflux for 10 minutes to effect further condensation. The hot syrup was compounded with 70 parts alpha flock and 0.4 part zinc stearate. The molding composition thus obtained was dried at 50° C. and molded under heat and pressure to form molded articles that were well cured and had good visual characteristics. Good plastic flow of the compound was indicated.

Example 6

| | Parts |
|---|---|
| Urea | 60 |
| Aqueous formaldehyde-neutral (37.1%) | 161 |
| Aqueous acetic acid (10%) | 1 |
| Aqueous ethylene diamine monoacetate (10%) | 10 |

The above components, with the exception of the basic amine salt, were mixed and heated under reflux for 15 minutes. The syrup was allowed to cool to room temperature. Then sufficient sodium hydroxide was added to make the syrup just alkaline to litmus. The aqueous solution of the monoacetic acid salt of ethylene diamine was added to this alkaline syrup. The syrup still had an alkaline reaction to litmus. The alkaline syrup was compounded with 70 parts alpha flock and 0.4 part zinc stearate to form a molding composition. The molding compound was dried at 50° C. for 2½ hours. Molding of the compound under heat and pressure produced molded articles which were well cured and of good color.

Example 7

| | Parts |
|---|---|
| Urea | 60.0 |
| Aqueous formaldehyde-neutral (37.1%) | 161.0 |
| Aqueous monoacetic acid salt of ethylene diamine (10%) | 7.5 |

The above components were mixed and heated under reflux for 10 minutes. A clear hot syrup was obtained. The syrup was mixed with 70 parts alpha flock and 0.4 part zinc stearate to form a molding composition. The compound was dried at 50° C. and molded under pressure at 130° C. to form well-cured molded products.

Condensation products of urea and formaldehyde alone, prepared as described in Examples 1 to 4, inclusive, but not inter-condensed with the specific basic polyamine salt mentioned in the individual example are heat-non-convertible. In other words, they will not cure under heat or under heat and pressure to the insoluble, infusible state.

It will be understood, of course, that the aldehyde-reactable basic polyamine salts mentioned in the above examples are only by way of illustration and that any other aldehyde-reactable basic polyamine salt may be used in carrying this invention into effect. Additional examples of such aldehyde-reactable basic amine salts are:

$$HC \begin{array}{c} NH_2 \cdot HCl \\ -NH_2 \\ NH_2 \end{array}$$
Triamino methane monohydrochloride $NH_2CH_2-CH_2NH_2 \cdot HCl$
Ethylene diamine monohydrochloride $NH_2CH_2CH_2NH_2 \cdot HBr$
Ethylene diamine monohydrobromide $NH_2CH_2CH_2NH_2 \cdot HI$
Ethylene diamine monohydroiodide $NH_2CH_2CH_2NH_2 \cdot HF$
Ethylene diamine monohydrofluoride $NH_2CH_2CH_2NH_2 \cdot HOOC-CH_3$
Ethylene diamine monoacetate $NH_2CH_2CH_2NH_2 \cdot HOOC-C_2H_5$
Ethylene diamine monopropionate $NH_2CH_2CH_2NH_2 \cdot HOOC-C_3H_7$
Ethylene diamine monobutyrate $NH_2CH_2CH_2NH_2 \cdot HOOC-C_4H_9$
Ethylene diamine monovalerate $NH_2CH_2CH_2NH_2 \cdot HOOC-C_6H_5$
Ethylene diamine monobenzoate $NH_2CH_2CH_2NH_2 \cdot HOOC-C_6H_4OH$
Ethylene diamine monosalicylate $(NH_2CH_2CH_2NH_2)_2 \cdot HOOC-COOH$
Ethylene diamine mono-oxalate $(NH_2CH_2CH_2NH_2)_2 \cdot (CH_2COOH)_2$
Ethylene diamine monosuccinate $(NH_2CH_2CH_2NH_2)_2 \cdot (CH_2CH_2COOH)_2$
Ethylene diamine monoadipate $$(NH_2CH_2CH_2NH_2)_3 \cdot HO\underset{\underset{CH_2COOH}{|}}{\overset{\overset{CH_2COOH}{|}}{C}}-COOH$$
Ethylene diamine monocitrate $$(NH_2CH_2CH_2NH_2)_2 \cdot \underset{\underset{COOH}{|}}{\overset{\overset{COOH}{|}}{CHOH}}-CHOH$$
Ethylene diamine monotartrate $NH_2CH_2CH_2NH_2 \cdot CH_2=CHCOOH$
Ethylene diamine monoacrylate $NH_2CH_2CH_2NH_2 \cdot CH_2=\underset{\underset{CH_3}{|}}{C}-COOH$
Ethylene diamine monomethacrylate $(NH_2CH_2CH_2NH_2)_2 \cdot CH_2=C\begin{array}{c} COOH \\ CH_2COOH \end{array}$
Ethylene diamine monoitaconate $(NH_2CH_2CH_2NH_2)_2 \cdot \begin{array}{c} CH-COOH \\ \| \\ CH-COOH \end{array}$
Ethylene diamine monomaleate $CH_3CH-CH_2NH_2 \cdot HCl$
  $|$
  $NH_2$
Propylene diamine monohydrochloride $CH_3CH-CH_2NH_2 \cdot HOOCCH_3$
  $|$
  $NH_2$
Propylene diamine monoacetate $CH_3CH-CH_2NH_2 \cdot HOOC-C_6H_5$
  $|$
  $NH_2$
Propylene diamine monobenzoate $NH_2CH_2CH_2CH_2NH_2 \cdot HBr$
Trimethylene diamine monohydrobromide $NH_2CH_2CH_2CH_2NH_2 \cdot HCl$
Trimethylene diamine monohydrochloride $NH_2-C_6H_4-NH_2 \cdot \frac{1}{2}H_2SO_4$
Phenylene diamine sulfate $NH_2CH_2CH_2N\begin{array}{c} CH_3 \\ CH_3 \end{array} \cdot HCl$
N, N-dimethyl, ethylene diamine monohydrochloride $NH_2CH_2CH_2NHC_2H_5 \cdot HCl$
N-ethyl, ethylene diamine monohydrochloride $NH-CH_2CH_2NHCH_3 \cdot HCl$
  $|$
  $CH_3$
N, N′-dimethyl, ethylene diamine hydrochloride The acids used in the preparation of the above salts have the characteristic property of being catalytically active in preparing aminoplasts, that is, in the preparation of soluble, fusible aminoplasts, specifically urea resins, and in converting such aminoplasts to an insoluble, infusible state.

It also will be understood that in each of the specific polyamine salts above mentioned the particular acid shown in any specific formula may be replaced by some other acid, care being taken in the choice of the acid in the light of the properties desired in the final products. For example, when light-colored molded articles are desired, the use of iodide salts of polyamines should be avoided.

In certain cases, it may be advantageous to use a single basic polyamine salt with a plurality of urea substances. Thus, to modify the characteristics of the molded product I may use a mixture of, for example, a thiourea and a triazine derivative, or urea and dicyandiamide, with a single basic polyamine salt. In other cases, instead of using a single basic polyamine salt, I may use a plurality of basic polyamine salts with a single urea substance or with a plurality of urea substances.

The ratio of the reactants to each other may be considerably varied but, in general, it is desirable to use at least one mol of aliphatic aldehyde for each mol of mixed (total) urea substance and basic amine salt. In producing the heat-convertible resinous condensation products of this invention, the proportion of basic amine salt in all cases is at least sufficient to impart self-curing characteristics to the resin. Ordinarily not exceeding substantially ¼ mol basic amine salt is used for each mol of urea substance. No advantage accrues from using an amount of basic amine salt above the minimum required to secure the desired curing rate. Further, the use of higher amounts of basic amine salt is undesirable for molding applications where light-colored products are required, because of the tendency of such basic salts in excessive amounts to give yellow resinous bodies. In some cases, particularly where high molecular weight amine salts are used, for example 1,2-diamino octadecyl hydrochoride, the polyamine salt in the resin molecule exceeds, on a weight basis, the urea portion of the molecule. Consequently, in such cases, the inherent characteristics (for example, waxy nature) of the high molecular weight polyamine salt predominate in the molecule. This may be objectionable in some applications of the molded part, for instance where resistance to ordinary organic solvents is required.

From the foregoing it will be seen that the particular mol ratio of polyamine salt to the other components is dependent somewhat upon the inherent characteristics of the polyamine salt and the curing characteristics and other properties desired in the heat-convertible and heat-hardened resinous condensation products. For molding applications the ratio of the aliphatic aldehyde to urea substance may be considerably varied, but generally will be within the range of 1½ to 2½ mols aliphatic aldehyde for each mol of urea substance. No particular advantage ordinarily accrues from the use of higher amounts of aldehyde. Approximately 2 mols aliphatic aldehyde per mol urea substance usually gives very satisfactory results, particularly from the viewpoint of optimum yields of condensation product per unit cost.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, trimethylol nitro methane, etc.; monoamides such as formamide, acetamide, stearamide, acrylamide, benzamide, toluene sulfonamide, etc.; polyamides such as adipic diamide, phthalamide and the like; amines such as ethylene diamine, aniline, phenylene diamine, amino phenols, etc.

The modifying bodies also may take the form of high molecular weight bodies, with or without resinous characteristics, for example partially hydrolyzed wood products, lignin, proteins, protein-aldehyde condensation products, furfural condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides.

Other modifying agents of a plasticizing or softening nature also may be incorporated with the condensation products of this invention. Examples of such modifying agents are the phthalate esters, for instance dimethyl phthalate, diethyl phthalate, dibutyl phthalate, etc., the phosphate esters such as tricresyl phosphate, triphenyl phosphate, etc.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Various fillers may be used to provide a wide variety of molding compositions. The choice of the filler depends upon the particular application for which the molded article is to be used. As fillers may be used, for instance, bleached or unbleached wood flour, alpha cellulose in flock form, sheets or cuttings of paper, cloth, canvas, etc., asbestos in powdered or long or short fiber length, powdered or flaked mica, wood chips, short or long wood fibers, synthetic or natural continuous threaded fibers, glass fibers in continuous filament or fabric (woven or felted) form, etc.

In the preparation of molding compositions from the resinous bodies of this invention, the non-dehydrated or the partially dehydrated resins may be compounded with the above addition agents in accordance with procedures well known to those skilled in the plastics art. The wet composition may be dried in the usual manner either at normal (room) temperature or at elevated temperatures in a preheated stream of air or under the influence of reflected heat energy. The dried compound may be densified through the usual processes of working in a Banbury mixer, or by rolling, pelleting or other means, followed by grinding and screening to the desired particle size. These molding compositions may be molded at elevated temperatures, preferably between 100° and 150° C., and at suitable pressures. The molding pressures generally range between about 1000 and about 4000 pounds per square inch, more particularly from about 2000 to 3000 pounds per square inch.

In addition to their use in molding compositions, the condensation products of this invention are especially suitable for use as fire retardants, water repellents and sizings when applied to wood or the like, or to fibrous materials such as silk, cotton, wool, synthetic organic fibers, etc., in continuous filament, thread, fabric or other form. It will be understood, of course, that optimum resistance to water, fire, solvents, etc., is obtained only when the applied coating or sizing is converted to the insoluble infusible (cured) state. The cellulosic or other fibrous materials to be treated may be surface coated or both coated and impregnated by any suitable means, for example by spraying with, or immersing in, a solution of the treating agent and thereafter removing the solvent.

The modified and unmodified products of this invention have a wide variety of other uses, for instance in making buttons, clock cases, radio cabinets, dishes and other household utensils, decorative novelties and various other cast, molded and laminated articles of manufacture. They may be used in making arc-extinguishing tubes capable of evolving an arc-extinguishing gas under the heat of the arc, in the production of wire or baking enamels and for bonding or cementing together mica flakes to form a laminated mica article. They also may be used in making laminated fibrous sheet materials wherein superposed layers of cloth, paper, etc., are firmly bonded together with the resin, as impregnants for electrical coils and other electrical devices, and for other purposes.

What I claim as new and desire to secure by Letters Patent of the United States is:

1. A composition of matter comprising a condensation product of a mixture comprising a urea, an aliphatic aldehyde and an aldehyde-reactable mono salt of a polyamine, said salt being obtained by reaction of the following components in proportions such as to form the mono salt:
(1) a polyamine and (2) an acid having the characteristic property of being catalytically active in the preparation of soluble, fusible urea resins and in converting such resins to an insoluble, infusible state.

2. A composition of matter comprising an alcohol-modified condensation product of ingredients comprising a urea, an aliphatic aldehyde and an aldehyde-reactable mono salt of a polyamine, said salt being obtained by reaction of the following components in proportions such as to form the mono salt: (1) a polyamine and (2) an acid having the characteristic property of being catalytically active in the preparation of soluble, fusible urea resins and in converting such resins to an insoluble, infusible state.

3. A heat-curable resinous composition comprising a soluble, fusible condensation product of ingredients comprising the following components in the stated molar ratios: 1 mol of a urea, at least 1 mol of formaldehyde and not exceeding substantially ¼ mol of an aldehyde-reactable mono salt of a polyamine, said salt being obtained by reaction of the following components in proportions such as to form the mono salt: (1) a polyamine and (2) an acid having the characteristic property of being catalytically active in the preparation of soluble, fusible urea resins and in converting such resins to an insoluble, infusible state.

4. A product comprising the cured resinous condensation product of claim 3.

5. A condensation product of a mixture comprising a urea, an aliphatic aldehyde and an aldehyde-reactable mono salt of a diamine, said salt being obtained by reaction of the following components in proportions such as to form the mono salt: (1) a diamine and (2) an acid having the characteristic property of being catalytically active in the preparation of soluble, fusible urea resins and in converting such resins to an insoluble, infusible state.

6. A molding composition comprising a heat-hardenable resinous condensation product of a mixture comprising urea, formaldehyde and an aldehyde-reactable mono organic salt of a diamine, said salt being obtained by reaction of the following components in proportions such as to form the mono salt: (1) a diamine and (2) an organic acid having the characteristic property of being catalytically active in the preparation of soluble, fusible urea resins and in converting such resins to an insoluble, infusible state.

7. A molding composition comprising a heat-hardenable resinous condensation product of a mixture comprising urea, formaldehyde and an aldehyde-reactable mono inorganic salt of a diamine, said salt being obtained by reaction of the following components in proportions such as to form the mono salt: (1) a diamine and (2) an inorganic acid having the characteristic property of being catalytically active in the preparation of soluble, fusible urea resins and in converting such resins to an insoluble, infusible state.

8. A molding composition comprising a filler and a soluble, fusible resinous condensation product of ingredients comprising the following components in the stated molar ratios: 1 mol urea, at least 1 mol formaldehyde and not exceeding substantially ¼ mol of ethylene diamine monohydrochloride.

9. A molding composition comprising a filler and a soluble, fusible resinous condensation product of ingredients comprising the following components in the stated molar ratios: 1 mol urea, at least 1 mol formaldehyde and not exceeding substantially ¼ mol of ethylene diamine monoacetate.

10. The method of producing a new aminoplast which comprises reacting to resin formation ingredients comprising the following components in the stated molar ratios: 1 mol of a urea, at least one mol of an aliphatic aldehyde and not exceeding substantially ¼ mol of an aldehyde-reactable mono salt of a polyamine, said salt being obtained by reaction of the following components in proportions such as to form the mono salt: (1) a polyamine and (2) an acid having the characteristic property of being catalytically active in the preparation of soluble, fusible urea resins and in converting such resins to an insoluble, infusible state.

11. A resinous composition obtained by reaction of a mixture comprising (1) a partial condensation product of ingredients comprising a urea and an aliphatic aldehyde and (2) an aldehyde-reactable mono salt of a polyamine, said salt being obtained by reaction of the following components in proportions such as to form the mono salt: (a) a polyamine and (b) an acid having the characteristic property of being catalytically active in the preparation of soluble, fusible urea resins and in converting such resins to an insoluble, infusible state.

12. A resinous composition obtained by reaction of ingredients comprising (1) ethylene diamine monoacetate and (2) an alkaline-catalyzed partial condensation product of ingredients comprising a urea and formaldehyde.

13. A resinous composition obtained by reaction of a mixture comprising (1) ethylene diamine monoacetate and (2) a product of partial condensation of ingredients comprising urea and formaldehyde while admixed with a small amount of alkaline material comprising ammonia and sodium hydroxide.

GAETANO F. D'ALELIO.

Certificate of Correction

Patent No. 2,334,545.  November 16, 1943.

GAETANO F. D'ALELIO

It is hereby certified that errors appear in the printed specification of the above numbered patent requiring correction as follows: Page 1, second column, line 48, for "oc-condensation" read *co-condensation*; page 2, first column, line 24, for "discoverey" read *discovery*; page 4, first column, lines 69 and 70, in the formula, for

read

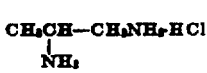

page 5, first column, line 53, after "superpolyamides" and before the period insert , *etc*; and that the said Letters Patent should be read with these corrections therein that the same may conform to the record of the case in the Patent Office.

Signed and sealed this 1st day of February, A. D. 1944.

[SEAL]

HENRY VAN ARSDALE,
*Acting Commissioner of Patents.*